US012574259B2

(12) United States Patent
De Caro et al.

(10) Patent No.: US 12,574,259 B2
(45) Date of Patent: Mar. 10, 2026

(54) MONITORING EXECUTION OF ACTIONS IN COMPUTER NETWORK ENVIRONMENTS

(71) Applicant: INTERNATIONAL BUSINESS MACHINES CORPORATION, Armonk, NY (US)

(72) Inventors: Angelo De Caro, Zurich (CH); Kaoutar El Khiyaoui, Zurich (CH); Venkatraman Ramakrishna, Bangalore (IN); Dhinakaran Vinayagamurthy, Erode (IN); Krishnasuri Narayanam, Bangalore (IN); Sandeep Nishad, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 18/155,846

(22) Filed: Jan. 18, 2023

(65) Prior Publication Data

US 2024/0243932 A1 Jul. 18, 2024

(51) Int. Cl.
*H04L 9/00* (2022.01)
*G06F 21/10* (2013.01)
(Continued)

(52) U.S. Cl.
CPC .............. *H04L 9/50* (2022.05); *H04L 9/0618* (2013.01); *H04L 9/3218* (2013.01); *G06F 21/1014* (2023.08)

(58) Field of Classification Search
CPC ...... H04L 9/50; H04L 9/3218; G06F 21/1014
See application file for complete search history.

(56) References Cited

U.S. PATENT DOCUMENTS

| | | | | |
|---|---|---|---|---|
| 10,652,019 B1 * | 5/2020 | Nicolas | ................ | H04L 9/3239 |
| 11,151,558 B2 * | 10/2021 | Ferenczi | ............... | G06Q 20/12 |

(Continued)

FOREIGN PATENT DOCUMENTS

CN          114240409 A          3/2022

OTHER PUBLICATIONS

Yao, Qian. Blockchain-Based New Financial Infrastructures: Theory, Practice and Regulation. 1st ed. Singapore: Springer, 2022 (Year: 2022).*

(Continued)

*Primary Examiner* — William R Korzuch
*Assistant Examiner* — Aditya Sriram
(74) *Attorney, Agent, or Firm* — Aaron Pontikos, Esq.; Blanche E. Schiller, Esq.; Heslin Rothenberg Farley & Mesiti P.C.

(57) ABSTRACT

Execution of one or more actions executing on at least one device is monitored to protect access to a selected digital asset. The monitoring includes determining whether a chosen action to be initiated by one entity to claim a chosen digital asset of another entity has completed. Based on determining that the chosen action has not completed, execution of a selected action, initiated by the other entity, to claim a selected digital asset of the one entity is prevented. Based on preventing execution of the selected action, a determination is made as to whether the chosen action has completed the claim of the chosen digital asset of the other entity. Based on determining that the chosen action has completed, completion of execution of the selected action to claim the selected digital asset of the one entity is facilitated.

20 Claims, 7 Drawing Sheets

(51) Int. Cl.
   H04L 9/06           (2006.01)
   H04L 9/32           (2006.01)

(56)                References Cited

U.S. PATENT DOCUMENTS

| 2008/0304657 A1* | 12/2008 | Tuyls ................... H04L 9/0869 |
| | | 380/28 |
| 2015/0244690 A1* | 8/2015 | Mossbarger ............. H04L 9/50 |
| | | 713/171 |
| 2019/0311351 A1* | 10/2019 | Zhang ................... G06Q 20/36 |
| 2019/0370792 A1 | 12/2019 | Lam |
| 2021/0344500 A1* | 11/2021 | Vaughan ............... H04L 9/3073 |
| 2021/0398116 A1 | 12/2021 | Fang et al. |

OTHER PUBLICATIONS

Manevich, Yacov et al., Cross Chain Atomic Swaps in the Absence of Time via Attribute Verifiable Timed Commitments, 2022 IEEE 7th European Symposium on Security and Privacy, 2022 (no further date information available), pp. 606-625.

Bugnet, Theodore et al., "XCC: Theft-Resilient and Collateral-Optimized Cryptocurrency-Backed Assets," 2022 (no further date information available), 20 pages.

Narayanam, Krishnasuri et al., "Atomic Cross-Chain Exchanges of Shared Assets," AFT '22, Sep. 19, 2022, 18 pages.

Han, Runchao et al., "On the Optionality and Fairness of Atomic Swaps," AFT '19, Oct. 21, 2019, 14 pages.

Abebe, Ermyas et al., "Enabling Enterprise Blockchain Interoperability with Trusted Data Transfer (industry track)," Middleware '19, Nov. 2019, 7 pages.

Nishad, Sandeep (contributor) et al., "Weaver: DLT Interoperability," https://github.com/hyperledger-labs/weaver-dlt-interoperability/#reedme, (no date information available), 6 pages.

Somogyvari, Peter (contributor) et al., "Hyperledger Cactus," https://github.com/hyperledger/cactus/, (no date information available), 4 pages.

* cited by examiner

START

300

MONITOR EXECUTION OF ONE OR
MORE ACTIONS TO PROTECT ACCESS ∼310

CHOSEN
ACTION, INITIATED
BY ONE ENTITY, TO CLAIM
A CHOSEN DIGITAL ASSET
OF ANOTHER ENTITY
HAS COMPLETED? ─320

NO

PREVENT EXECUTION
OF A SELECTED ACTION,
INITIATED BY ANOTHER
ENTITY, TO CLAIM A
SELECTED DIGITAL
ASSET OF THE
ONE ENTITY

330

YES

COMPLETE EXECUTION OF
THE SELECTED ACTION ∼340

END

MONITORING EXECUTION OF ACTIONS IN COMPUTER NETWORK ENVIRONMENTS

BACKGROUND

One or more aspects relate, in general, to facilitating processing within a computing environment, and in particular, to improving processing within a computer network environment.

A computer network environment includes multiple devices (e.g., multiple computers) connected to one another via one or more networks. Such environments are widely used to perform many types of processing including, but not limited to, processing using blockchains.

A blockchain is a digital ledger that exists across a network. A digital ledger is a computerized database that uses cryptography to secure records. Digital ledgers, such as blockchains, are used in transactional and contractual protocols. An example contractual protocol is a hashed timelock contract protocol that enables entities to perform an atomic cross-chain swap of digital assets.

Although hashed timelock contract protocols and similar protocols provide a certain amount of protection for the entities of the contract, certain vulnerabilities still exist. Thus, such protocols are to be improved, improving processing within network environments.

SUMMARY

Shortcomings of the prior art are overcome, and additional advantages are provided through the provision of a computer-implemented method of facilitating processing within a computing environment. The computer-implemented method includes monitoring execution of one or more actions executing on at least one device of a plurality of devices coupled via one or more networks to protect access to a selected digital asset. The monitoring includes determining whether a chosen action has completed; the chosen action to be initiated by one entity to claim a chosen digital asset of another entity. Based on determining that the chosen action has not completed the claim of the chosen digital asset of the other entity, execution of a selected action, initiated by the other entity, to claim a selected digital asset of the one entity is prevented. Based on preventing execution of the selected action to claim the selected digital asset of the one entity, a determination is made as to whether the chosen action has completed the claim of the chosen digital asset of the other entity. Based on determining that the chosen action has completed the action to claim the chosen digital asset of the other entity, completion of execution of the selected action to claim the selected digital asset of the one entity is facilitated.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
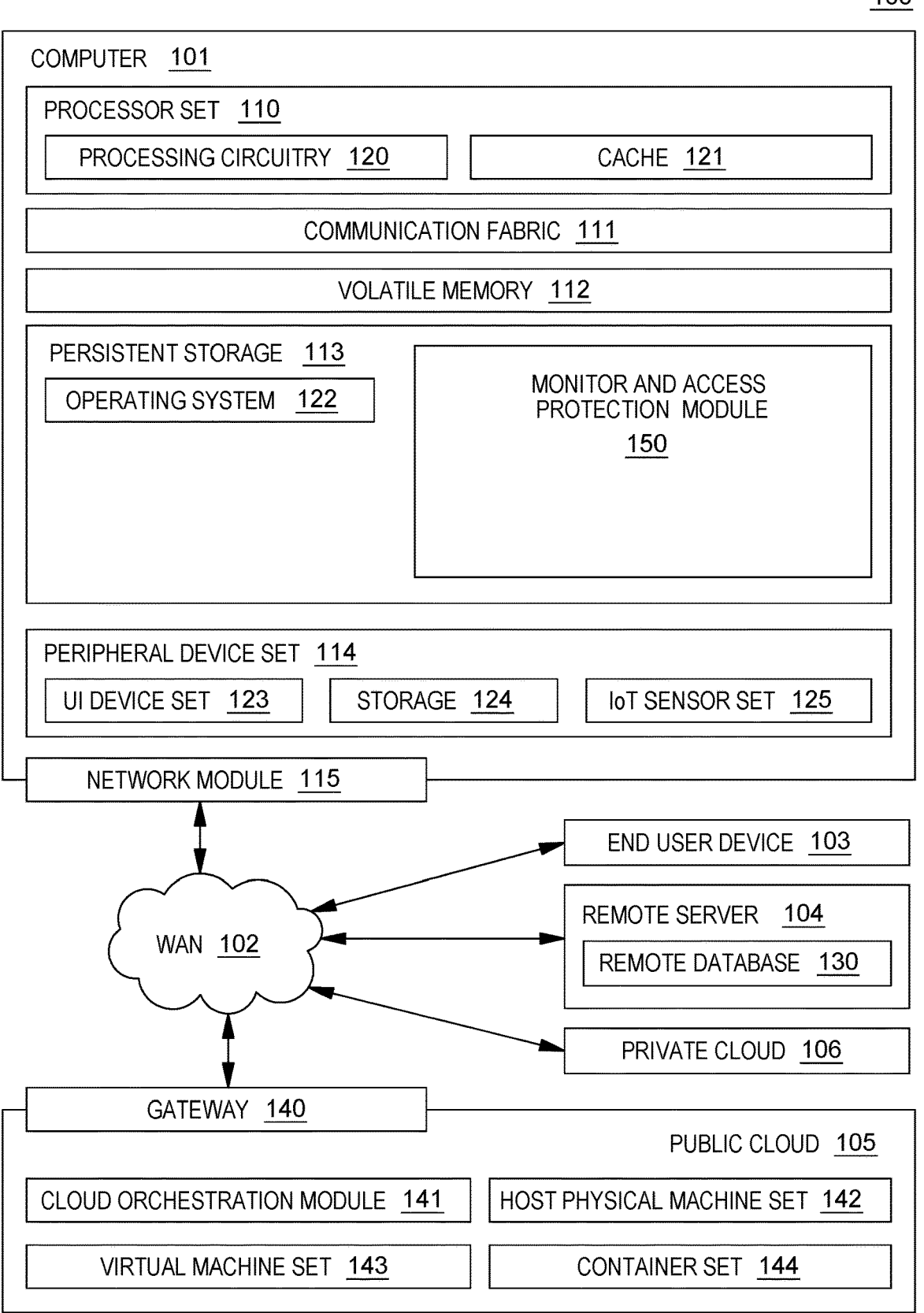
FIG. 1 depicts one example of a computing environment to incorporate and use one or more aspects of the present invention.

In accordance with one or more aspects of the present invention, a capability is provided to facilitate processing within a computing environment. In one or more aspects, the capability includes monitoring execution of actions in a computing environment, such as a network environment, and protecting access to digital assets based on the monitoring. Access to digital assets is controlled, providing access in selected circumstances. This improves processing within the computing environment, providing secure actions and protection of digital assets.

One or more aspects of the present invention are incorporated in, performed and/or used by at least one computing environment. As examples, the computing environment may be of various architectures and of various types, including, but not limited to: personal computing, client-server, distributed, network, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) to monitor and protect access to digital assets and/or perform one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as monitor and access protection code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

Figures 2, 3:
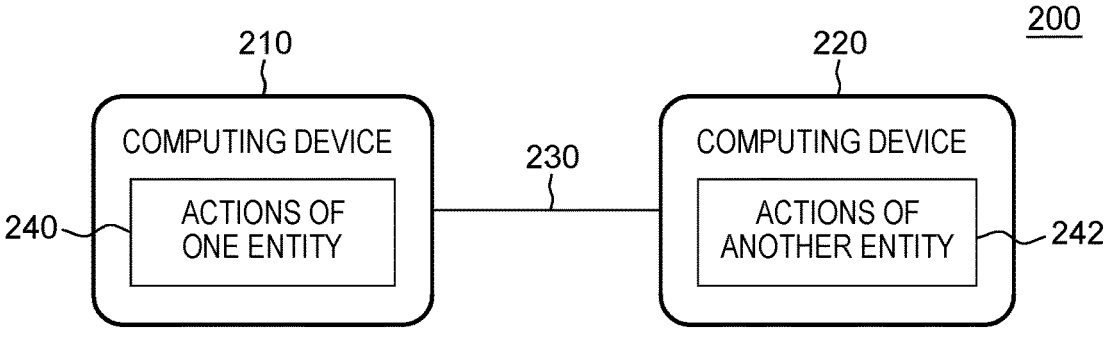
FIG. 2 depicts one example of a computer network environment used in accordance with one or more aspects of the present invention.
FIG. 3 depicts one example of processing to perform monitoring and access protection, in accordance with one or more aspects of the present invention.

In one example, multiple computing devices (e.g., one or more computers (e.g., computer(s) 101, etc.), one or more end user devices (e.g., end user device(s) 103, etc.), one or more remote servers (e.g., remote server(s) 104, etc.), one or more processors of a processor set (e.g., processor set 110), one or more nodes of a processor of a processor set (e.g., processor set 110) and/or one or more other computing devices) may be coupled to one another via one or more networks, as depicted in FIG. 2.

Referring to FIG. 2, in one example, a computing environment 200 is a network environment in which a computing device 210 is coupled to a computing device 220 via one or more networks 230. In one example, one entity (Entity A) executes actions 240 (e.g., transactions, processes, scripts, etc.) on a computing device (e.g., computing device 210) to claim a digital asset (e.g., cryptocurrency, payment, other resource, etc.) of another entity (e.g., Entity B). Further, the other entity (e.g., Entity B) executes actions 242 (e.g., transactions, processes, scripts, etc.) on a computing device (e.g., computing device 220) to claim a digital asset (e.g., cryptocurrency, payment, other resource, etc.) of the one entity (e.g., Entity A). A computing environment may include additional, fewer and/or other computing devices; and/or there may be additional and/or other entities involved. For instance, some processing related to claiming a digital asset, such as committee processing described below and/or other processing, may be performed by a committee and/or other entity, which perform actions on one or more of computing devices 210, 220, one or more other computing devices of computing environment 200 and/or of another computing environment. Many options are possible.

In one example, in order for one entity (Entity A) to claim a digital asset of another entity (Entity B), a hashed timelock contract is used. A hashed timelock contract is a type of smart contract used in blockchain applications. A blockchain is a digital ledger, such as a computerized database that uses cryptography to secure records, that exists across a network. In one example, a hashed timelock contract has a payment clause and a refund clause, as described below.

As an example, in a hashed timelock contract, entity A locks certain tokens ($ID_1, ID_2, \ldots, ID_n$) under a condition (y, $pk_{Entity\ A}$, $pk_{Entity\ B}$) such that:

$$\{(x, \sigma){:}[y = H(x) \wedge \text{Verify}\left(pk_{Entity\ B}, \sigma\right)] \vee$$
$$(BH + 30 > = CBH) \wedge \text{Verify}\left((pk_{Entity\ A}, \sigma)\right)\}$$

where:
x is a confidential value (e.g., selected by Entity A).
H(x) is a hash of x.
pk is public key.
The Payment Clause is (y=H(x)$\wedge$Verify(pk$_{Entity\ B}$,$\sigma$)).
The Refund Clause is (BH+30>=CBH)$\wedge$Verify ((pk$_{Entity\ A}$,$\sigma$))
BH is the block where the hashed timelock contract appears.
CBH is the block containing the transaction Entity A submits to Refund Clause.
$\sigma$ is a signature over the block chain transaction unlocking Entity A's tokens.
Entity B can unlock (Payment) if, and only if, Entity B produces a valid signature and shows knowledge of a pre-image of y.
Entity A can unlock (Refund) if, and only if, Entity A produces a valid signature and enough time (measured in Blocks), based on predefined rules, has lapsed.

Digital ledgers, such as blockchains, are used in transactional and contractual protocols, such as the hashed timelock contract protocol, to enable entities to perform an atomic cross-chain swap of digital assets. An atomic cross-chain swap is, for instance, smart contract technology providing a distributed coordination task that enables entities to exchange digital assets across multiple blockchains. For instance, one entity (Entity A) can claim a digital asset of another entity (Entity B), and the other entity (Entity B) can claim a digital asset of the one entity (Entity A) via atomic cross-chain swap using hashed timelock contracts.

In this example of atomic cross-chain swap, two chains (A and B) support hashed timelock contract protocols and each entity (Entity A, Entity B) has an account on both chains. Two hashed timelock contracts of the following form (one in each chain) are published:
Payment: Both contracts use a confidential value x (e.g., chosen by Entity A) but, one uses Entity A's signature and the other contract uses Entity B's signature.
Refund: One hashed timelock contract (Entity A's) is to wait more than the other (Entity B's). This is to avoid having Entity A win it all. The time delay is to be significant enough to allow the entities to claim their payment/refund. Examples of a time delay include one day, a select number of hours, etc. Other amounts of time may be chosen.
When Entity A claims Entity B's payment, Entity A reveals x. When Entity B sees Entity A's claim, Entity B may claim Entity A's payment. The swap can be cancelled via Refund.

Although hashed timelock contract protocols and similar protocols provide a certain amount of protection for the entities of the contract, certain vulnerabilities still exist. Thus, in accordance with one or more aspects of the present invention, monitoring and access protection of the digital assets are provided. For instance, an action of one entity to claim a digital asset is monitored to determine when another entity may perform an action to claim another digital asset. An example of this processing is described with reference to FIG. 3. A process used to perform the processing is executed, in one or more examples, by one or more computing devices, such as one or more computers (e.g., computer(s) 101, other computer(s), etc.), one or more servers (e.g., remote server(s) 104, other server(s), etc.), one or more end user devices (e.g., end user device(s) 103, other device (s), etc.), one or more processors and/or processing circuitry (e.g., of processor set 110 or other processor sets), one or more nodes of a processor, etc. Although example computing devices are provided, additional, fewer and/or other computing devices may be used for the processes/processing to perform monitoring and access protection. Various options are possible.

Referring to FIG. 3, in one example, a digital asset access protection process 300 includes, for instance, monitoring execution 310 of one or more actions to protect access to a digital asset. The monitoring includes, for instance, determining 320 whether a chosen action, initiated by one entity (e.g., Entity A), to claim a chosen digital asset of another entity (Entity B) has completed. Based on determining that the chosen action to claim the chosen digital asset has not completed, process 300 prevents execution 330 of a selected action, initiated by the other entity, to claim a selected digital asset of the one entity. Based on preventing execution of the selected action to claim the selected digital asset, process 300 continues, in one example, with determining 320 whether the chosen action to claim the chosen digital asset of the other entity has completed. This repeated processing may be performed until a particular condition has been met (e.g., chosen action is complete, a certain amount of time has elapsed, a threshold number of times has been met, etc.). If a particular condition has been met, other than the chosen action is complete, process 300 terminates the processing without completing the other entity's claim. However, if process 300 determines that the claim to the chosen digital asset has completed, process 300 completes execution 340 of the selected action to claim the selected digital asset.

To provide the monitoring and access protection, in accordance with one or more aspects of the present invention, a monitor and access protection module (e.g., monitor and access protection module 150) is employed, in one example. A monitor and access protection module (e.g., monitor and access protection module 150) includes, for example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and may be executed by and/or using one or more computing devices (e.g., one or more computers, such as computer(s) 101; one or more end user devices, such as end user device(s) 103; one or more servers, such as remote server(s) 104; one or more processors or nodes, such as processor(s) or node(s) of processor set 110; and/or processing circuitry, such as processing circuitry 120 of processor set 110; and/or other computing devices.) Additional and/or other computers, end-user devices, servers, processors, nodes, processing circuitry and/or other computing devices may be used to execute one or more of the sub-modules and/or portions thereof. Many examples are possible.

Figure 4:
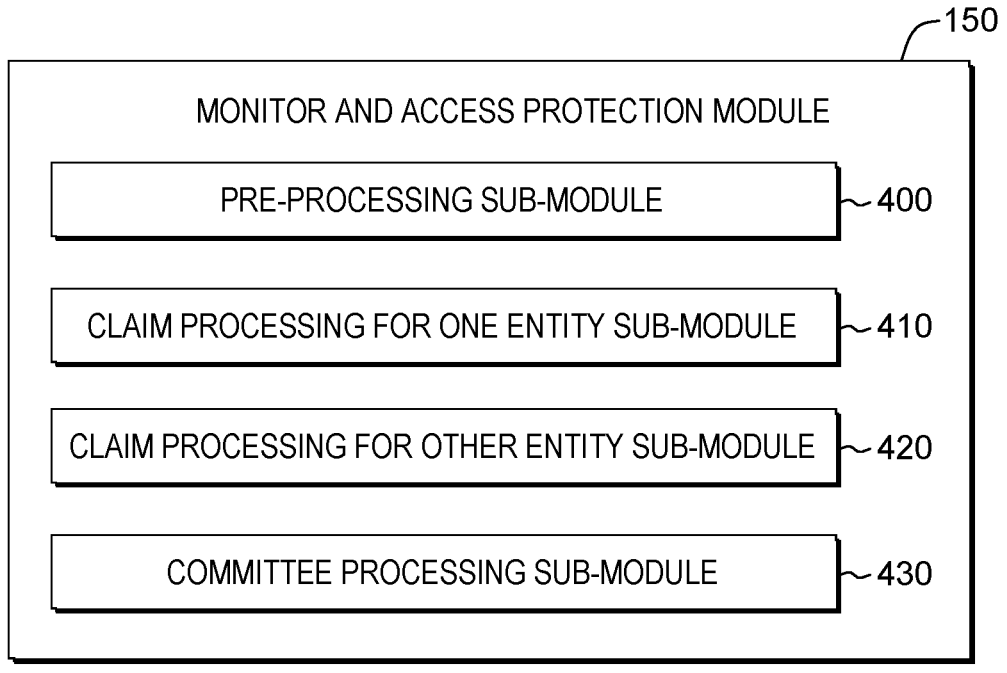
FIG. 4 depicts one example of sub-modules of a monitor and access protection module of FIG. 1, in accordance with one or more aspects of the present invention.

One example of monitor and access protection module 150 is described with reference to FIG. 4. In one example, monitor and access protection module 150 includes a pre-processing sub-module 400 to perform pre-processing for one embodiment of monitoring and access protection; a claim processing for one entity sub-module 410 to perform claim processing for one entity (e.g., Entity A); a claim processing for other entity sub-module 420 to perform claim processing for the other entity (e.g., Entity B); and a committee processing sub-module 430 to perform committee processing in one embodiment of monitoring and access protection. Additional, fewer and/or other sub-modules may be provided and/or used in one or more aspects of the present invention.

Figure 5:
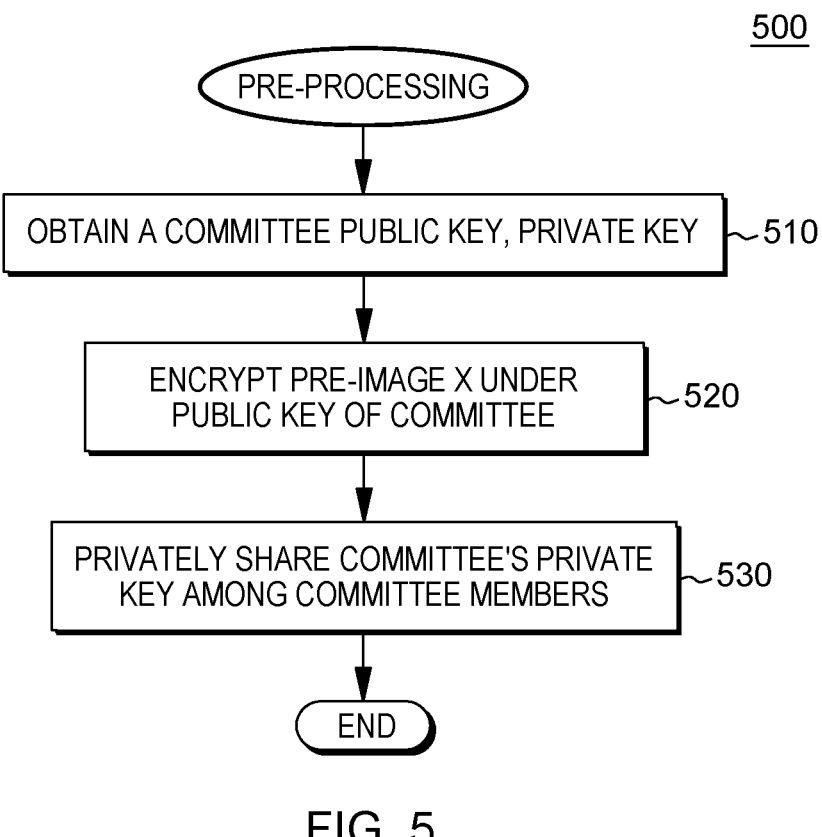
FIG. 5 depicts one example of pre-processing performed in at least one embodiment to monitor and protect access to digital assets, in accordance with one or more aspects of the present invention.
Figure 6:
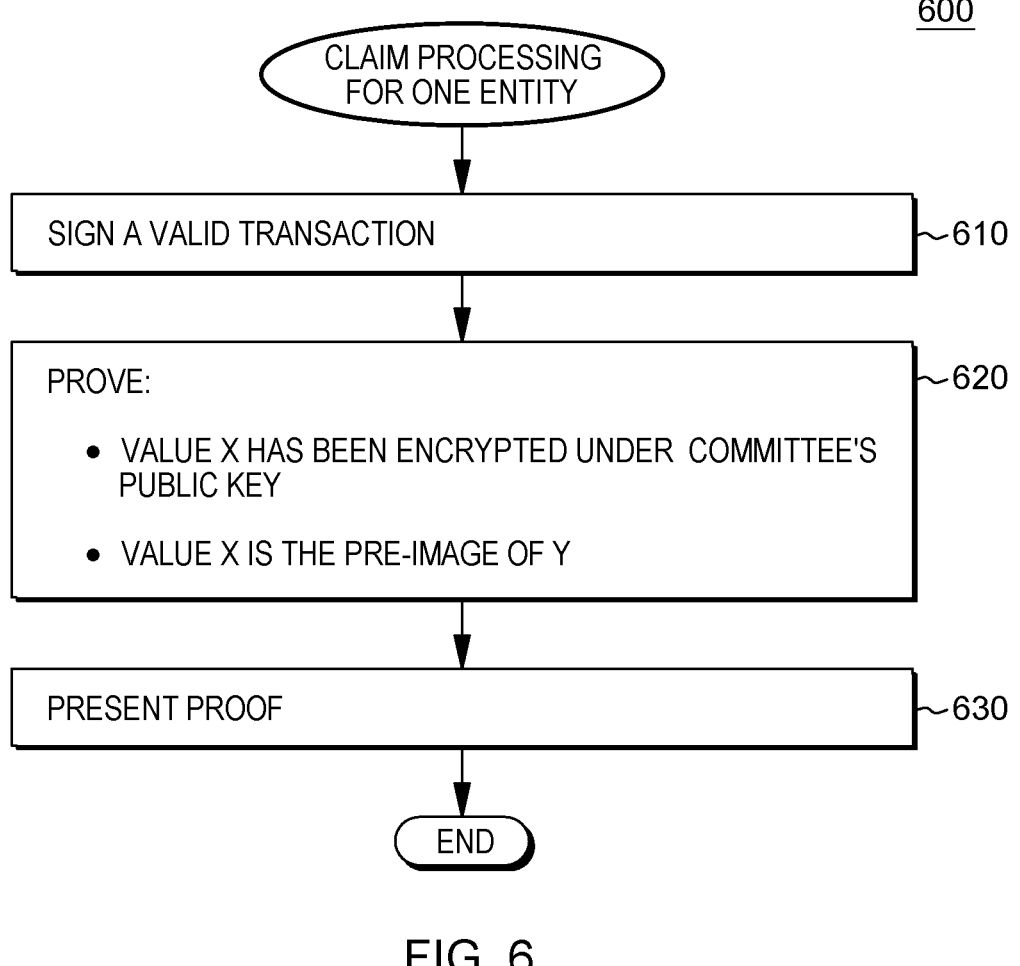
FIG. 6 depicts one example of digital asset claim processing for one entity, in accordance with one or more aspects of the present invention.
Figure 7:
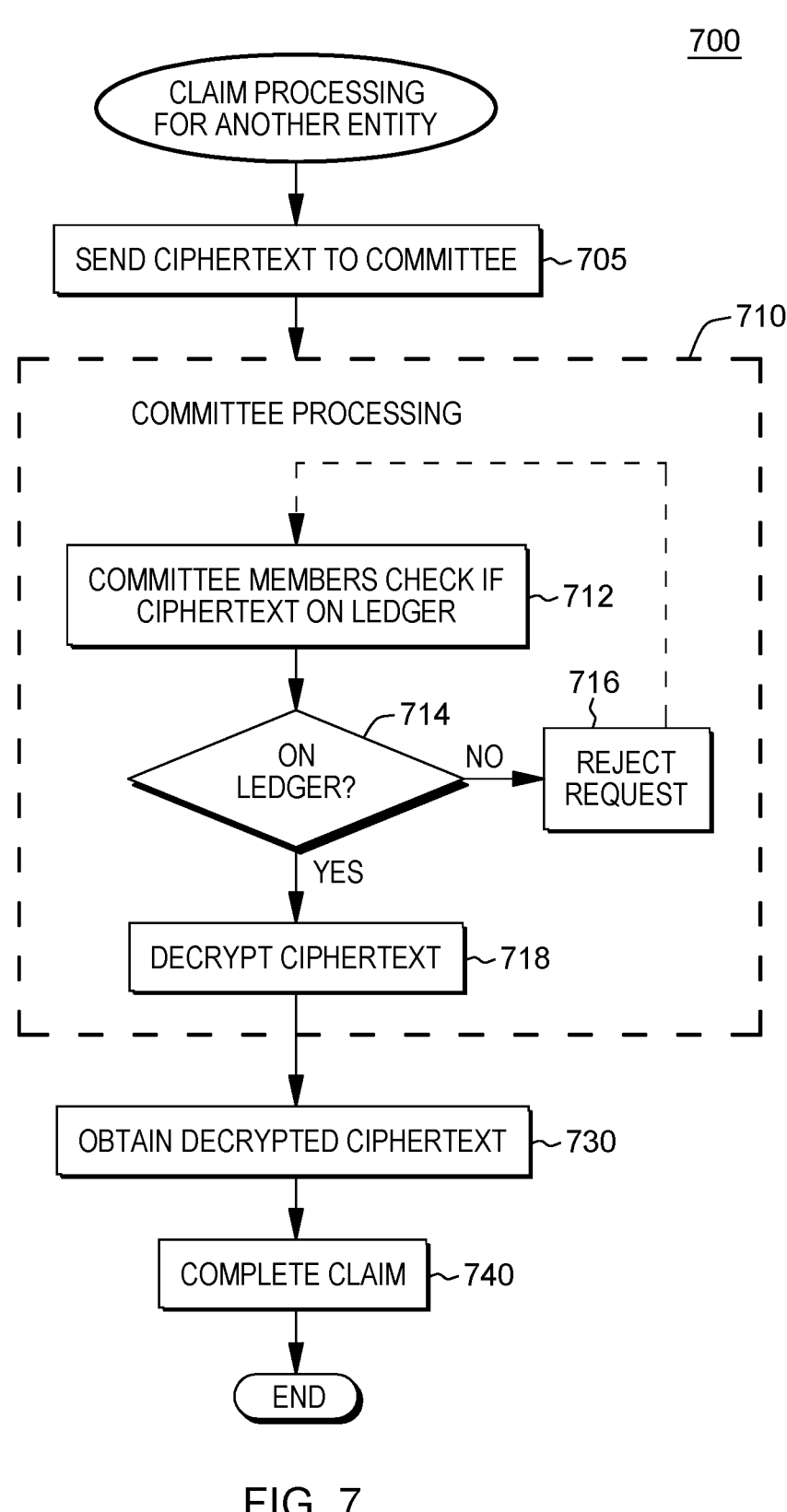
FIG. 7 depicts one example of digital asset claim processing for another entity, in accordance with one or more aspects of the present invention.
Figure 8:
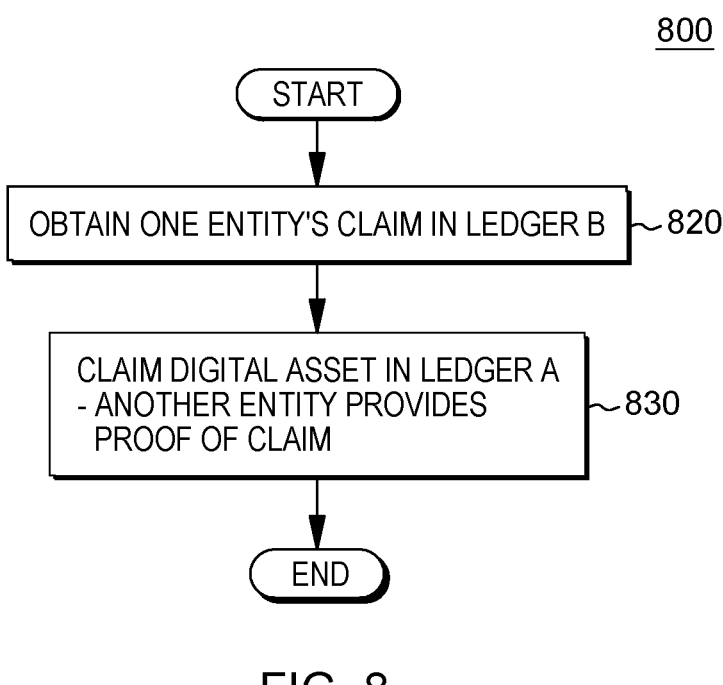
FIG. 8 depicts another example of processing to protect access to digital assets, in accordance with one or more aspects of the present invention.

In one example, one or more of the sub-modules may be used in the monitoring and access protection process described with reference to FIG. 3. Further, in one or more embodiments, one or more of the sub-modules are used in monitoring and access protection processing, as further described with reference to FIGS. 5-8. FIG. 5 depicts one example of a process to perform pre-processing for one embodiment of monitoring and access protection; FIG. 6 depicts one example of a process to perform claim processing for one entity; FIG. 7 depicts one example of a process to perform claim processing for another entity; and FIG. 8 depicts another example of a process to protect access to digital assets.

Each process used to perform the processing is executed, in one or more examples, by one or more computing devices, such as one or more computers (e.g., computer(s) 101, other computer(s), etc.), one or more servers (e.g., remote server(s) 104, other server(s), etc.), one or more end user devices (e.g., end user device(s) 103, other device(s), etc.), one or more processors and/or processing circuitry (e.g., of processor set 110 or other processor sets), one or more nodes of a processor, etc. Although example computing devices are provided, additional, fewer and/or other computing devices may be used for the processes/processing to perform monitoring and access protection. Various options are possible.

In one embodiment of monitoring and access protection, one entity (e.g., Entity A) encrypts a pre-image x (e.g., x is a pre-image of y under a hash function h) under a public key, such as a public key of a committee. The committee has, for instance, n selected members. The members may be selected using one or more of various techniques. For example, in a consortium-based blockchain, a member from each organization (or selected organizations) forming the consortium may participate in the committee; or members can be selected from a permissionless blockchain (a.k.a., a public block chain) in which anyone can participate in the validation of data. Other examples of selecting members for the committee may be used.

Further, as part of monitoring and access protection, Entity A uses a zero-knowledge proof based solution (or other solution) to prove that it knows the value x, that was encrypted under the committee's public key. Further, another entity (e.g., Entity B) engages in a protocol with the committee to claim a digital asset of the one entity.

In one example, to perform monitoring and access protection using a committee, pre-processing is performed. The pre-processing is performed to enable a claim by one entity (e.g., Entity A) of a digital asset of another entity (e.g., Entity B) to complete, prior to allowing execution of a claim by the other entity (e.g., Entity B) of a digital asset of the one entity (e.g., Entity A). Execution of the claim by the other entity (e.g., Entity B) is prevented until a specified event, such as completion of the claim by the one entity (e.g., Entity A). One example of the pre-processing is described with reference to FIG. 5.

In one example, a pre-processing process 500 obtains 510, e.g., a public key and a private key of a committee of n members. Process 500 encrypts 520 pre-image x under the obtained public key of the committee. Further, in one example, the committee's private key is (k,n) privately shared 530 among the members of the committee.

The pre-processing facilitates claim processing by at least one entity. For instance, claim processing for one entity (e.g., Entity A) is performed in order for the one entity to claim a chosen digital asset of another entity (e.g., Entity B). One example of this claim processing is described with reference to FIG. 6. In one example, a claim process 600 executes one or more actions to prove that the one entity has completed its claim. As examples, process 600 is a script or a transaction or is included in a script or a transaction that utilizes a payment clause. Other possibilities also exist.

The payment clause includes, for instance, that the one entity is to sign 610 a valid transaction that spends the script, and is to present a valid zero knowledge proof 620 that the one entity knows a value x such that it has been encrypted under the committee's public key and that it is a pre-image of y in the hashed timelock contract script. To further explain, zero knowledge is a type of cryptographic protocol in which one party (the prover) can prove to another party (the verifier) that it knows a specific piece of information, without revealing any information about the content of that information. One type of zero knowledge proof system that can be used to prove the authenticity of a statement without revealing any information about the statement itself is Succinct Non-Interactive Arguments of Knowledge. Succinct Non-Interactive Arguments of Knowledge is a general purpose system, which means that it can be used to prove the authenticity of a wide range of statements. In one example, as used herein, a zero knowledge proof is generated, e.g., to prove the knowledge when Entity A is claiming Entity B's asset, of the confidential value x and randomness r such that:

x is a valid pre-image of y, $H(x)=y$, where $H(x)$ is a hash of x.

x is encrypted under the public key of the committee. Namely, $Ct=Encrypt(PK\_C,x;r)$, in which Ct is the output of the execution of the encryption function of a public key encryption scheme on input, the public key of the committee PK_C, message x, and randomness r.

In one example, x and r are confidential to Entity A, and y, CT, PK_C are public.

Process 600 presents 630 the proof of the one entity (e.g., the zero knowledge proof). For example, an indication of the proof is placed on a ledger (e.g., blockchain). This indication is then used, in one example, in claim processing by the other entity. In one example, the proof placed on the ledger is a ciphertext encrypting x. A ciphertext is an encrypted text that is created based on encrypting plaintext using an encryption algorithm. Various encryption algorithms may be used. To learn the plaintext, a decryption algorithm, e.g., corresponding to the encryption algorithm, is used.

One embodiment of claim processing for the other entity is described with reference to FIG. 7. In one example, a claim process 700 executes one or more actions to claim a selected digital asset of the one entity (e.g., Entity A). As examples, process 700 is a script or a transaction or is included in a script or a transaction. Other possibilities also exist.

In one example, process 700, on behalf of the other entity (e.g., Entity B), sends 705 the ciphertext (obtained from claim processing of the one entity) to the committee. Based on receiving the ciphertext, a committee process 710 commences committee processing. As part of this processing, each committee member (or selected committee members) checks 712, e.g., via process 710, if the ciphertext is on the ledger. If the ciphertext is not on the ledger 714, process 710 rejects 716 the request, and in one example, the check is repeated. This repeated processing may be performed until a particular condition has been met (e.g., the ciphertext is on the ledger, a certain amount of time has elapsed, a threshold number of times has been met, etc.). If a particular condition has been met, other than the ciphertext being on the ledger, process 710 terminates the processing rejecting the request. However, if the ciphertext is on the ledger, process 710 facilitates completion of the other entity's claim by, for instance, decrypting 718 the ciphertext using, for instance, a multi-party computation protocol.

A multi-party computation protocol is, in one example, a secure protocol that is a sub-field of cryptography that enables participants of a group to jointly compute a function on their inputs without revealing their inputs to each other. In one example, the secure multi-party computation protocol uses a confidential data sharing technique (e.g., secret sharing) to distribute confidential data (e.g., confidential value, private key, other confidential information) among the group of participants in such a way that only certain subsets of the participants are able to reconstruct the confidential data.

In one example of the confidential data sharing technique, the confidential data is divided into n pieces, called shares, such that any k or more shares can be used to reconstruct the original confidential data, but fewer than k shares provide no information about the confidential data.

The confidential data sharing technique may be combined with zero knowledge proofs (e.g., Multi-Party Computation-SPDZ) to enable the parties to perform a wide range of calculations in a confidential preserving manner.

In accordance with one or more aspects of the present invention, shares of a private key, SK_C, is confidentially shared among the members of the committee such that the i-th member of the committee possesses the i-th share of SK_C, sh_i,SK_C. As an example, the key-pair (SK_C, PK_C) can be generated by a trusted dealer that executes the confidential data sharing scheme and then distributes the shares to members of the committee. Other examples are possible.

When the committee is asked to decrypt ciphertext Ct, after any authorizations to be performed, the members of the committee engage in a multi-party computation protocol that computes the following function, as an example: On input of the sh_i,SK_C and CT, the function first reconstructs the confidential data, SK_C, from the shares. Then, the function computes a decryption function on input SK_C and CT to obtain message m. The message m is returned.

The decrypted ciphertext (e.g., message m) is provided to the other entity (e.g., Entity B). Process 700 obtains 730 (e.g., is provided, fetches, retrieves, receives, etc.) the decrypted ciphertext, which is proof by the other entity that the one entity's claim is complete, and based thereon, completes 740 the claim for the other entity.

In another embodiment, committee processing may not be performed. Instead, a proof of claim based solution is provided. With this solution, in one example, each entity performs locking (e.g., of tokens), as specified in a protocol, such as a hashed timelock contract protocol. When the other entity (e.g., Entity B) is claiming a selected digital asset of the one entity (e.g., Entity A), the other entity provides a proof of claim by the one entity of the other entity's chosen digital asset. This proof is recorded on a ledger (e.g., a ledger on a computing device on which the other entity is performing claiming actions). The providing of proof may be achieved by using a script or a transaction (or other mechanism) having a payment clause that includes a verification of proof of the one entity's claim. The proof generation and verification may use, in one example, cross-chain data sharing, in which either the event of the one entity's claim or the proof of the current owner of the other entity's asset can be shared. One example of proof of claim processing is further described with reference to FIG. 8.

In one example, a process 800 executes one or more actions to generate a proof of claim. As an example, process 800 is a script or a transaction or is included in a script or a transaction. Other possibilities exist.

In one example, process 800 obtains 820, from a selected ledger (e.g., Ledger B) as specified in the protocol, such as the hashed timelock contract protocol, an indication of a completed claim for the one entity. Based on obtaining the one entity's claim from the selected ledger, process 800 performs 830 a claim for a selected digital asset of the one entity, which is in another ledger (e.g., Ledger A). As part of this processing, the other entity provides 830 proof of the one entity's claim. In one example, cross-chain data sharing is used to generate the proof of the one entity's claim that can be verified by the other entity.

A cross-chain or cross-network data sharing protocol enables one network to query the state of another's ledger with proof of that state's authenticity. It is achieved by the stitching of smart contracts running in separate networks in which a data requirement in a workflow in one network can be fulfilled by sourcing that data from a different network rather than relying on potentially untrustworthy clients or third parties. This enables the scaling up of workflows across (or spanning) multiple networks without sacrificing the decentralization and trust offered by distributed ledger technology protocols. In an embodiment, a client application in one network requests data from another network's peers and submits the received data to its network's peers for validation. Each network has a relay that acts as an ingress and egress point for cross-network communication (i.e., messages and notifications). This pair of networks relays communication messages using a distributed ledger technology-agnostic protocol.

Described herein are embodiments of a monitor and access protection capability in which a selected claim of a selected digital asset is prevented until a chosen claim of a chosen digital asset is complete in an atomic cross-chain swap using, e.g., hashed timelock contracts. This prevents violation of security properties of protocols, such as hashed timelock contract protocols, used in atomic cross-chain swaps of digital assets (e.g., cryptocurrency, payments, other resources, etc.). It prevents an entity, such as Entity B, from unauthorized taking of a pre-image of the transaction and/or causing the transaction of Entity A from failing. This improves processing within a computing environment, such as a network environment, by enhancing protection within the environment and facilitating processing within the environment.

Although various examples are provided herein, other examples/embodiments are possible. For instance, different protocols may be used. Further, there may be more than two entities involved. Other aspects, variations and/or embodiments are possible.

One or more aspects of the present invention are tied to computer technology and facilitate processing within a computer, improving performance thereof. For instance, processing is improved by enhancing protection within the environment and by facilitating processing. Processing within a processor, computer system and/or computing environment is improved.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other protocols may be used. Further, variations to the processing may be performed without departing from one or more aspects of the present invention. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

monitoring execution of one or more actions executing on at least one device of a plurality of devices coupled via one or more networks to protect access to a selected digital asset, the monitoring including:

determining that a chosen action initiated by one entity to claim a chosen digital asset of another entity has not completed, wherein the chosen action includes proving that the one entity knows information about a particular value including that the particular value has been encrypted under a public key of a committee of a plurality of members, and wherein the particular value is a pre-image of a selected value in a hashed timelock contract script;

preventing execution of a selected action, initiated by the another entity, to claim a selected digital asset of the one entity, based on determining that the chosen action has not completed the claim of the chosen digital asset of the another entity;

determining, based on preventing execution of the selected action to claim the selected digital asset of the one entity, that the chosen action has completed the claim of the chosen digital asset of the another entity, wherein the determining that the chosen action has completed the claim of the chosen digital asset of the another entity comprises checking by at least multiple members of the plurality of members of the committee that an indication of the chosen action is included in a ledger, wherein the chosen action has completed based on the at least multiple members of the committee finding the indication in the ledger; and executing one or more actions to complete the selected action to claim the selected digital asset of the one entity, based on determining that the chosen action has completed the claim of the chosen digital asset of the another entity.

2. The computer-implemented method of claim 1, wherein the checking that the indication of the chosen action is included in the ledger includes performing the checking by each member of the plurality of members of the committee, wherein the chosen action has completed based on each member of the committee finding the indication in the ledger.

3. The computer-implemented method of claim 1, wherein the indication is a ciphertext related to the chosen action.

4. The computer-implemented method of claim 3, wherein the executing one or more actions to complete the selected action to claim the selected digital asset of the one entity comprises:

decrypting the ciphertext; and providing a decrypted ciphertext to complete the execution of the selected action to claim the selected digital asset of the one entity.

5. The computer-implemented method of claim 1, wherein the executing one or more actions to complete the selected action comprises obtaining proof by the another entity that the indication is in the ledger.

6. The computer-implemented method of claim 5, wherein the obtaining proof that the indication is in the ledger comprises using cross-chain data sharing.

7. The computer-implemented method of claim 1, wherein the monitoring execution is performed as part of a cross-chain swap of digital assets.

8. A computer system for facilitating processing within a computing environment, the computer system comprising:

a plurality of devices coupled via one or more networks, wherein the computer system is configured to perform a method, said method comprising:

monitoring execution of one or more actions executing on at least one device of the plurality of devices to protect access to a selected digital asset, the monitoring including:

determining that a chosen action initiated by one entity to claim a chosen digital asset of another entity has not completed, wherein the chosen action includes proving that the one entity knows information about a particular value including that the particular value has been encrypted under a public key of a committee of a plurality of members, and wherein the particular value is a pre-image of a selected value in a hashed timelock contract script;

preventing execution of a selected action, initiated by the another entity, to claim a selected digital asset of the one entity, based on determining that the chosen action has not completed the claim of the chosen digital asset of the another entity;

determining, based on preventing execution of the selected action to claim the selected digital asset of the one entity, that the chosen action has completed the claim of the chosen digital asset of the another entity, wherein the determining that the chosen action has completed the claim of the chosen digital asset of the another entity comprises checking by at least multiple members of the plurality of members of the committee that an indication of the chosen action is included in a ledger, wherein the chosen action has completed based on the at least multiple members of the committee finding the indication in the ledger; and executing one or more actions to complete the selected action to claim the selected digital asset of the one entity, based on determining that the chosen action has completed the claim of the chosen digital asset of the another entity.

9. The computer system of claim 8, wherein the checking that the indication of the chosen action is included in the ledger includes performing the checking by each member of the plurality of members of the committee, wherein the chosen action has completed based on each member of the committee finding the indication in the ledger.

10. The computer system of claim 8, wherein the executing one or more actions to complete the selected action comprises obtaining proof by the another entity that the indication is in the ledger.

11. The computer system of claim 10, wherein the obtaining proof that the indication is in the ledger comprises using cross-chain data sharing.

12. The computer system of claim 8, wherein the indication is a ciphertext related to the chosen action.

13. The computer system of claim 12, wherein the executing one or more actions to complete the selected action to claim the selected digital asset of the one entity comprises:

decrypting the ciphertext; and providing a decrypted ciphertext to complete the execution of the selected action to claim the selected digital asset of the one entity.

14. A computer program product for facilitating processing within a computing environment, the computer program product comprising:

one or more computer readable storage media and program instructions collectively stored on the one or more computer readable storage media that performs a method comprising:

monitoring execution of one or more actions executing on at least one device of a plurality of devices coupled via one or more networks to protect access to a selected digital asset, the monitoring including:

determining that a chosen action initiated by one entity to claim a chosen digital asset of another entity has not completed, wherein the chosen action includes proving that the one entity knows information about a particular value including that the particular value has been encrypted under a public key of a committee of a plurality of members, and wherein the particular value is a pre-image of a selected value in a hashed timelock contract script;

preventing execution of a selected action, initiated by the another entity, to claim a selected digital asset of the one entity, based on determining that the chosen action has not completed the claim of the chosen digital asset of the another entity;

determining, based on preventing execution of the selected action to claim the selected digital asset of the one entity, that the chosen action has completed the claim of the chosen digital asset of the another entity, wherein the determining that the chosen action has completed the claim of the chosen digital asset of the another entity comprises checking by at least multiple members of the plurality of members of the committee that an indication of the chosen action is included in a ledger, wherein the chosen action has completed based on the at least multiple members of the committee finding the indication in the ledger; and executing one or more actions to complete the selected action to claim the selected digital asset of the one entity, based on determining that the chosen action has completed the claim of the chosen digital asset of the another entity.

15. The computer program product of claim 14, wherein the checking that the indication of the chosen action is included in the ledger includes performing the checking by each member of the plurality of members of the committee, wherein the chosen action has completed based on each member of the committee finding the indication in the ledger.

16. The computer program product of claim 14, wherein the executing one or more actions to complete the selected action comprises obtaining proof by the another entity that the indication is in the ledger.

17. The computer program product of claim 16, wherein the obtaining proof that the indication is in the ledger comprises using cross-chain data sharing.

18. The computer program product of claim 14, wherein the monitoring execution is performed as part of a cross-chain swap of digital assets.

19. The computer program product of claim 14, wherein the indication is a ciphertext related to the chosen action.

20. The computer program product of claim 19, wherein the executing one or more actions to complete the selected action to claim the selected digital asset of the one entity comprises:

decrypting the ciphertext; and providing a decrypted ciphertext to complete the execution of the selected action to claim the selected digital asset of the one entity.

* * * * *